US009021172B2

(12) United States Patent
Horsnell et al.

(10) Patent No.: US 9,021,172 B2
(45) Date of Patent: Apr. 28, 2015

(54) DATA PROCESSING APPARATUS AND METHOD AND METHOD FOR GENERATING PERFORMANCE MONITORING INTERRUPT SIGNAL BASED ON FIRST EVENT COUNTER AND SECOND EVENT COUNTER

(75) Inventors: Matthew James Horsnell, Cambridge (GB); Christopher Daniel Emmons, Austin, TX (US)

(73) Assignee: ARM Limited, Cambridge (GB)

( * ) Notice: Subject to any disclaimer, the term of this patent is extended or adjusted under 35 U.S.C. 154(b) by 342 days.

(21) Appl. No.: 13/543,306

(22) Filed: Jul. 6, 2012

(65) Prior Publication Data

US 2014/0013020 A1    Jan. 9, 2014

(51) Int. Cl.
*G06F 13/24*    (2006.01)

(52) U.S. Cl.
CPC ...................... *G06F 13/24* (2013.01)

(58) Field of Classification Search
USPC .................................. 710/260–269
See application file for complete search history.

(56) References Cited

U.S. PATENT DOCUMENTS

| | | | |
|---|---|---|---|
| 5,557,548 A | 9/1996 | Gover et al. | |
| 5,675,729 A | 10/1997 | Mehring | |
| 5,768,500 A * | 6/1998 | Agrawal et al. | 714/47.2 |
| 5,797,019 A * | 8/1998 | Levine et al. | 710/262 |
| 5,802,378 A * | 9/1998 | Arndt et al. | 710/267 |
| 5,835,705 A | 11/1998 | Larsen et al. | |
| 5,937,437 A | 8/1999 | Roth et al. | |
| 5,991,708 A | 11/1999 | Levine et al. | |
| 6,088,421 A | 7/2000 | Rao et al. | |
| 6,499,028 B1 | 12/2002 | Brock et al. | |
| 7,809,928 B1 | 10/2010 | Allen et al. | |
| 7,917,677 B2 * | 3/2011 | Johnson et al. | 710/260 |
| 8,230,059 B1 | 7/2012 | Santos et al. | |
| 8,572,295 B1 * | 10/2013 | Cai et al. | 710/15 |
| 2004/0064290 A1 | 4/2004 | Cabral et al. | |
| 2004/0168005 A1 * | 8/2004 | Civlin | 710/260 |
| 2005/0155018 A1 | 7/2005 | DeWitt, Jr. et al. | |
| 2006/0143421 A1 * | 6/2006 | Subramoney et al. | 711/170 |
| 2008/0177756 A1 | 7/2008 | Kosche et al. | |
| 2008/0183430 A1 | 7/2008 | Kitsunai et al. | |
| 2009/0319758 A1 * | 12/2009 | Kimura | 712/220 |
| 2010/0042765 A1 * | 2/2010 | Chinya et al. | 710/104 |
| 2010/0070669 A1 * | 3/2010 | Johnson et al. | 710/264 |
| 2010/0161867 A1 * | 6/2010 | Fertig et al. | 710/305 |
| 2010/0262870 A1 | 10/2010 | Davies | |
| 2011/0173588 A1 | 7/2011 | Salapura et al. | |
| 2012/0089984 A1 | 4/2012 | Adar et al. | |
| 2014/0019656 A1 * | 1/2014 | Hum et al. | 710/266 |

OTHER PUBLICATIONS

IBM, Power ISA Version 2.06 Revision B, Jul. 23, 2010, 10 pages.

(Continued)

*Primary Examiner* — Raymond Phan
(74) *Attorney, Agent, or Firm* — Nixon & Vanderhye P.C.

(57) ABSTRACT

A data processing apparatus has performance monitoring circuitry for generating performance monitoring data. The performance monitoring circuitry includes a first event counter for counting occurrences of a first event and a second event counter for counting occurrences of a second event. A performance monitoring interrupt signal is indicated if, when the number of first events counted by the first event counter reaches a first threshold value, the number of second events by the second event counter meets an interrupt triggering condition.

17 Claims, 7 Drawing Sheets

(56) References Cited

OTHER PUBLICATIONS

Intel 64 and IA-32 Architectures Software Developer's Manual, Combined vols. 1, 2A, 2B, 3A, 3B, 3C, May 2012, 128 pages.

Sun Microsystems, UltraSPARC T2 Supplement to the UltraSPARC Architecture 2007, Draft D1.4.3, Sep. 19, 2007, 11 pages.

AMD64 Technology, AMD64 Architecture Programmer's Manual, vol. 2: System Programming, Publication No. 24593, May 2011, 9 pages.

* cited by examiner

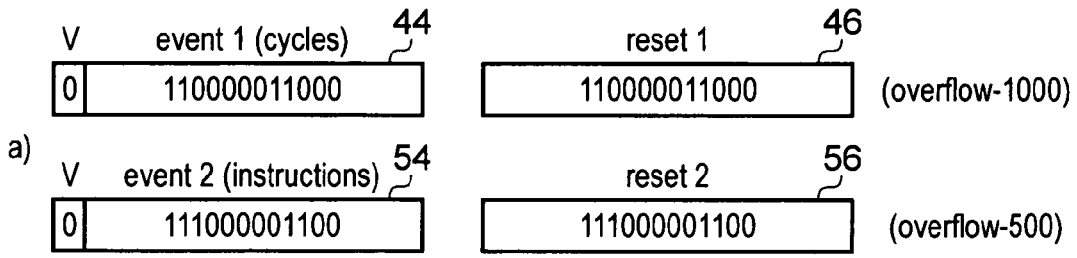
a)
b) after 1000 cycles, 448 instructions executed
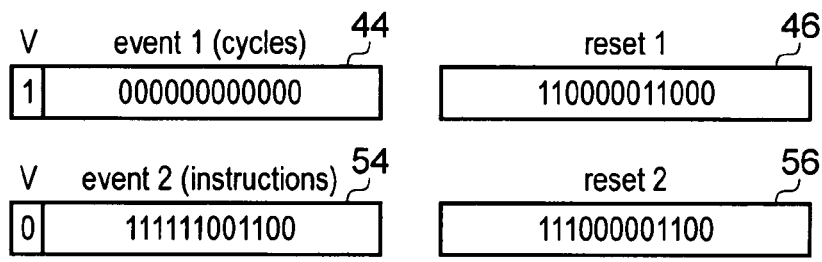
event 1 overflow → check event 2
no event 2 overflow, so no interrupt (<0.5 instructions per cycle)
c) reset both registers
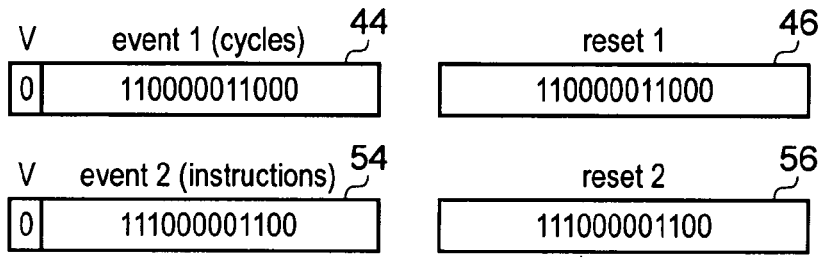
d) after 1000 cycles, 502 instructions executed
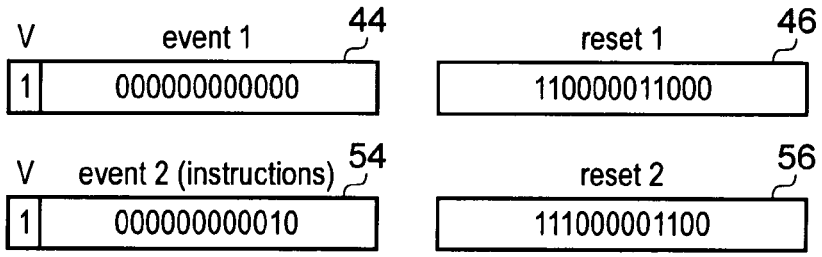
event 1 overflow → check event 2
event 2 overflow → generate interrupt (≥ 0.5 instructions per cycle)
FIG. 3

| Event number | Event type | Event mnemonic | Description |
|---|---|---|---|
| 0x00 | Architectural | SW_INCR | Instruction architecturally executed, condition code check pass, software increment |
| 0x01 | Microarchitectural | L1I_CACHE_REFILL | Level 1 instruction cache refill |
| 0x02 | Microarchitectural | L1I_TLB_MISS | Level 1 instruction TLB refill |
| 0x03 | Microarchitectural | L1D_CACHE_REFILL | Level 1 data cache refill |
| 0x04 | Microarchitectural | L1D_CACHE | Level 1 data cache access |
| 0x05 | Microarchitectural | L1D_TLB_REFILL | Level 1 data TLB refill |
| 0x06 | Architectural | LD_RETIRED | Instruction architecturally executed, condition code check pass, load |
| 0x07 | Architectural | ST_RETIRED | Instruction architecturally executed, condition code check pass, store |
| 0x08 | Architectural | INST_RETIRED | Instruction architecturally executed |
| 0x09 | Architectural | EXC_TAKEN | Exception taken |
| 0x0A | Architectural | EXC_RETURN | Instruction architecturally executed, condition code check pass, exception return |
| 0x0B | Architectural | CID_WRITE_RETIRED | Instruction architecturally executed, condition code check pass, write to CONTEXTIDR |
| 0x0C | Architectural | PC_WRITE_RETIRED | Instruction architecturally executed, condition code check pass, software change of the PC |

FIG. 4

| | | | |
|---|---|---|---|
| 0x0D | Architectural | BR_IMMED_RETIRED | Instruction architecturally executed, immediate branch |
| 0x0E | Architectural | BR_RETURN_RETIRED | Instruction architecturally executed, condition code check pass, procedure return |
| 0x0F | Architectural | UNALIGNED_LDST_RETIRED | Instruction architecturally executed, condition code check pass, unaligned load or store |
| 0x10 | Microarchitectural | BR_MIS_PRED | Mispredicted or not predicted branch speculatively executed |
| 0x11 | Microarchitectural | CPU_CYCLES | Cycle |
| 0x12 | Microarchitectural | BR_PRED | Predictable branch speculatively executed |
| 0x13 | Microarchitectural | MEM_ACCESS | Data memory access |
| 0x14 | Microarchitectural | L1I_CACHE | Level 1 instruction cache access |
| 0x15 | Microarchitectural | L1D_CACHE_WB | Level 1 data cache write-back |
| 0x16 | Microarchitectural | L2D_CACHE | Level 2 data cache access |
| 0x17 | Microarchitectural | L2D_CACHE_REFILL | Level 2 data cache refill |
| 0x18 | Microarchitectural | L2D_CACHE_WB | Level 2 data cache write-back |
| 0x19 | Microarchitectural | BUS_ACCESS | Bus access |
| 0x1A | Microarchitectural | MEMORY_ERROR | Local memory error |
| 0x1B | Microarchitectural | INST_SPEC | Instruction speculatively executed |
| 0x1C | Architectural | TTBR_WRITE_RETIRED | Instruction architecturally executed, condition code check pass, write to TTBR |
| 0x1D | Microarchitectural | BUS_CYCLES | Bus cycle |
| 0x1E | - | - | Reserved |
| 0x1F | - | - | Reserved |

FIG. 4 (continued)

a) trigger interrupt if, when event 1 overflows,
event 2 or event 3 meets its condition,
or
b) trigger interrupt if, when event 1 overflows,
event 2 and event 3 meets its condition

DATA PROCESSING APPARATUS AND METHOD AND METHOD FOR GENERATING PERFORMANCE MONITORING INTERRUPT SIGNAL BASED ON FIRST EVENT COUNTER AND SECOND EVENT COUNTER

BACKGROUND TO THE INVENTION

1. Field of the Invention

The present invention relates to the field of data processing. More particularly, the invention relates to a data processing apparatus having performance monitoring circuitry for generating performance monitoring data indicative of processing performance of the data processing apparatus.

2. Description of the Prior Art

It is known to provide a data processing apparatus with performance monitoring circuitry for generating performance monitoring data indicative of processing performance of the apparatus. For example, the performance monitoring circuitry may count occurrences of an event occurring within the data processing apparatus, such as the execution of an instruction or a cache miss. An interrupt may be generated when the counter reaches a given value, so that when a performance issue arises, such as a large number of cache misses, then the processing apparatus may be triggered to perform a given operation based on the performance monitoring data, for example an operation to address the performance issue identified by the performance monitoring data.

SUMMARY OF THE INVENTION

Viewed from one aspect, the present invention provides a data processing apparatus for performing data processing, comprising:

performance monitoring circuitry configured to generate performance monitoring data indicative of processing performance of said data processing apparatus; and an interrupt controller configured to generate, in response to said performance monitoring data, a performance monitoring interrupt signal for triggering said data processing apparatus to perform a predetermined operation;

wherein said performance monitoring circuitry comprises a first event counter configured to count occurrences of a first event and a second event counter configured to count occurrences of a second event; and said interrupt controller is configured to generate said performance monitoring interrupt signal if when the number of first events counted by said first event counter reaches a first event threshold value, the number of second events counted by said second event counter satisfies an interrupt triggering condition.

The present technique recognises that some performance metrics of interest depend on the number of events of one type that occur per occurrence of an event of another type. For example, it may be useful to monitor the number of instructions executed per cycle, the number of cache misses per cache access, number of cache misses per thousand instructions, and so on. Such performance metrics are inefficient to monitor with existing circuits because such circuits usually trigger an interrupt when a single event counter reaches a given value. For a metric A/B representing the number of occurrences of a numerator event A per occurrence of a denominator event B, both events would be counted, and an interrupt would be generated when the counted number of denominator events B reaches a given value. In response to the interrupt, a software interrupt handler executed by the processing apparatus would check the number of numerator events A to see whether it meets a required condition. If the number of numerator events A does not meet the condition, then the processing apparatus would have been interrupted unnecessarily as no action would need to be taken if the monitored metric A/B does not meet the required condition. Since interrupts cause a costly context switch into an interrupt handler, the unnecessary interrupt reduces performance of the processing which was previously being executed by the processing apparatus.

Therefore, to improve the technique for monitoring performance metrics representing the rate of occurrence of a second event per occurrence of a first event, the present technique provides performance monitoring circuitry with a first event counter and a second event counter for counting occurrences of the first and second events respectively, and an interrupt controller which triggers interrupts based on the counted number of both types of event. The interrupt controller generates a performance monitoring interrupt signal if, when the number of first events counted by the first event counter reaches a first event threshold value, the number of second events counted by the second event counter satisfies an interrupt triggering condition. Hence, the first and second event counters are paired up so that, when the first event count reaches a given value, the second event count is checked and an interrupt is generated if the second event count meets the interrupt triggering condition. The first event threshold value and interrupt triggering condition are set so that, effectively, the interrupt controller generates an interrupt if the number of second events per occurrence of the first event meets a given condition. This improves the efficiency of monitoring performance metrics corresponding to the rate of one event relative to another event.

The interrupt controller does not generate the performance monitoring interrupt signal if when the number of first events counted by the first event counter reaches the first event threshold value, the number of second events counted by the second event counter does not satisfy the interrupt triggering condition. Therefore, the data processing apparatus is only interrupted if the interrupt triggering condition is satisfied. If the performance metric (second events per first event) being monitored does not satisfy the interrupt triggering condition, then the existing processing of the data processing apparatus can continue, improving processing performance.

The performance monitoring circuitry and interrupt controller may generate the interrupt signal in hardware based on the counted numbers of both type of events, without invoking a software routine to be executed by processing circuitry of the data processing apparatus for checking the value of the second event counter.

The interrupt triggering condition may be considered to be satisfied in different ways. For example, the interrupt triggering condition may be satisfied if, when the number of first events has reached the first threshold value, the number of second events has reached a second event threshold value. In this case, then the triggering of the performance monitoring interrupt signal will indicate that the number of second events per first event is greater than or equal to the value obtained by dividing the second event threshold value by the first event threshold value. This interrupt triggering condition may be of interest if a particularly high number of second events per first event indicates a performance issue which may require action from the processing apparatus.

On the other hand, in other cases the interrupt triggering condition may be satisfied if the number of second events counted by the second event counter has not reached a second event threshold value. In this case, triggering of the interrupt indicates that the number of second events per first event is less than the value obtained by dividing the second event threshold value by the first event threshold value. This interrupt triggering condition would usually be selected if a low value of the performance metric (number of second events per first event) indicates a performance issue which may require action to be taken.

The event counters may be configured in various ways. In one example, the first event counter and second event counter may each comprise an event count register which is incremented in response to each occurrence of the first event or second event. The incrementing may be performed by adding 1 to the current count register value on each occurrence of the event, so that the register count increases as more events occur. Alternatively, the incrementing may be performed by subtracting 1 from the value each time an event occurs so that the register counts down as more events occur.

It would be possible to arrange the interrupt controller to detect the absolute value of the performance counter and determine whether or not the required number of events have occurred based on the absolute value. However, an efficient technique for monitoring whether the threshold number of events has occurred is to arrange the first or second event count register so that it will overflow after a desired number of events have been counted. An overflow occurs when the most significant bit of a signed data value changes state following an addition or subtraction of a value of the same sign as the signed data value. For example, adding 1 to an 8-bit value 0b01111111 results in 0b10000000, or subtracting 1 from an 8-bit value 0b00000000 results in 0b11111111. Typically, a register will have an overflow bit which switches states when an overflow occurs, and this change of state can be used to detect that the desired number of events have been counted. Since this requires only a single overflow bit to be monitored, this approach is simpler than determining whether a threshold number of events have elapsed based on the absolute value of the counter.

Hence, when the interrupt controller detects that the first event counter register has overflowed, then the interrupt controller may determine whether to generate the performance monitoring interrupt signal in dependence on whether or not the second event count register has overflowed.

The performance monitoring circuit may reset the first event counter to a first initial value and reset the second event counter to a second initial value if the number of second events does not satisfy the interrupt triggering condition when the number of first events has reached the first event threshold value. This effectively divides the performance monitoring into successive periods each corresponding to the first event threshold number of first events. At the end of each period, the second event counter is checked and an interrupt is generated if during that period, the rate of second events per first event met the required condition. Resetting the counters periodically in this way enables a more realistic determination of whether performance conditions of interest have occurred, since it is more useful to determine whether many events of interest have occurred in a short space of time than to detect a slow accumulation of counts over a long period of time.

For example, if the performance metric to be monitored is whether or not the number of instructions per cycle over a thousand cycles is greater or less than half, then the first event is the elapse of a processing cycle and the second event is the execution of an instruction. The first initial value may be set so that the first event counter will overflow after 1000 counts and the second initial value may be set so that the second event counter will overflow after 500 counts. This means that after 1000 cycles, the first event counter will overflow, and the interrupt controller will determine whether to trigger the performance monitoring interrupt signal based on whether the second event counter has overflowed (indicating that at least 500 instructions were executed, i.e. greater than or equal to 0.5 instructions per cycle) or not overflowed (indicating fewer than 500 instructions were executed, i.e. less than 0.5 instructions per cycle).

The first and second event counters may have corresponding reset registers for storing the first and second initial values. The first and second reset registers can be programmed to set desired threshold values for the performance metric corresponding to the number of second events per first event.

The first and second event counters may each also comprise an event type register which stores an event type value defining what type of event is counted as the first event and second event respectively. Hence, the user of the apparatus can program which performance metrics are measured by selecting an appropriate first event and second event.

It will be appreciated that the apparatus may comprise multiple instances of the first event counter and second event counter so that several different kinds of performance metric can be measured. Also, the first and second event counters and interrupt controller of the present technique may also be used together with individual event counters for which the interrupt controller generates an interrupt in response to occurrences of a single event.

Also, multiple event counters may be linked to the same first event counter. If two or more different performance metrics have the same event as the denominator of the metric (for example number of instructions per cycle and number of branch predictions per cycle both have the same denominator of processing cycles), then these metrics can be measured using the same first event counter. By avoiding duplication of the first event counter, resources can be conserved for measuring other parameters. Hence, in addition to the first and second event counters the apparatus may also comprise at least one further event counter for counting occurrences of at least one further event. The interrupt controller may generate the performance monitoring interrupt signal if, when the number of first events reaches the first event threshold value, at least one of number of second events counted by the second event counter and the number of further events counted by the at least one further event counter satisfies a corresponding interrupt triggering condition. The triggering condition may be different for the second event counter and the one or more further event counters. In this way, an interrupt is generated if either the number of second events per first event or the number of further events per first event satisfies a corresponding condition set for that metric.

On the other hand, in other examples the interrupt controller may require that the number of second events counted by the second event counter and number of further events counted by each further event counter should all satisfy the corresponding interrupt triggering condition when the number of first event reaches the first event threshold value. This allows cascading of events so that interrupts are only generated when an overflow is detected for the denominator event counter alongside overflow or non-overflow (depending on the desired interrupt triggering condition) in multiple numerator event counters.

The first and second events may comprise many different kinds of events, for example any two of the following events:
a processing cycle elapsing;
an instruction being executed;
an instruction being executed speculatively;
an instruction of a predetermined type being executed;
a cache access;
a cache miss;

a translation lookaside buffer access;
a translation lookaside buffer miss;
a memory access;
a bus access;
a branch prediction; and
a branch misprediction.

These events and other events may be combined in many ways as the first event and second event, in order to monitor a wide range of performance metrics representing the number of second events per first event.

The predetermined operation performed by the data processing apparatus in response to the performance monitoring interrupt signal may comprise a range of different kinds of operation. In general, the predetermined operation may be any operation which uses the performance monitoring data in some way.

For example, the predetermined operation may comprise an operating system of the data processing apparatus controlling task scheduling in dependence on the performance monitoring interrupt. For example, the performance monitoring circuit may have detected that the number of instructions executed per cycle is very low and the performance monitoring interrupt signal may then signal to the operating system that some background processes could be executed.

Also, in a system having plurality of processors, the predetermined operation may comprise controlling switching of processing between the processors in dependence upon the performance monitoring interrupt signal. This is particularly useful in a system having heterogeneous processors which have different characteristics. In such systems, often one processor is more powerful but less energy efficient than the other processor. Therefore, performance parameters such as the number of instructions being executed per cycle can be useful for determining which processor can perform the required processing most efficiently. If few instructions are being executed per cycle, then the smaller processor can be used to save energy, while if a large number of instructions need to be executed in parallel then the larger processor could be used. Similarly, other performance metrics may also be useful in performing efficient scheduling. Therefore, the interrupt generated by the performance monitoring circuitry based on the rate of second events per first event can provide information to a hypervisor for controlling which of the processors should perform a given task.

Also, the performance monitoring interrupt signal could trigger the data processing apparatus to start or stop capturing of the performance monitoring data. The performance monitoring data generated by the performance monitoring circuit may only be of interest when a performance-related problem is detected. Therefore, when the performance monitoring data indicates normal conditions the data may not be captured, but when the performance monitoring metric represented by the number of second events per first event rises or falls to an abnormal value then the interrupt controller may issue the performance monitoring interrupt signal to trigger the processing apparatus to start capturing the performance monitoring data, so that someone can later analyse the captured data to determine the cause of the problem.

Similarly, trace generating circuitry, which generates trace data indicative of operations performed by the data processing apparatus, may be activated or deactivated in response to the performance monitoring interrupt signal. Hence, when performance conditions are normal then trace bandwidth can be conserved by deactivating trace generation, while when the performance metric indicates a potential performance-related problem then the interrupt controller can issue the performance monitoring interrupt to active the trace generation, so that someone can analyse the trace data later to identify what is causing the problem.

It will be appreciated that there are many other operations which could be performed in response to the performance monitoring interrupt signal.

Viewed from another aspect, the present invention provides a data processing apparatus for performing data processing, comprising:

performance monitoring means for generating performance monitoring data indicative of processing performance of said data processing apparatus; and interrupt controlling means for generating, in response to said performance monitoring data, a performance monitoring interrupt signal for triggering said data processing apparatus to perform a predetermined operation;

wherein said performance monitoring means comprises first event counting means for counting occurrences of a first event and second event counting means for counting occurrences of a second event; and said interrupt controlling means is configured to generate said performance monitoring interrupt signal if, when the number of first events counted by said first event counting means reaches a first event threshold value, the number of second events counted by said second event counting means satisfies an interrupt triggering condition.

Viewed from a further aspect, the present invention provides a data processing method comprising steps of:

performing data processing using a data processing apparatus;

generating performance monitoring data indicative of processing performance of said data processing; and generating, in response to said performance monitoring data, a performance monitoring interrupt signal for triggering said data processing apparatus to perform a predetermined operation;

wherein said step of generating performance monitoring data includes counting occurrences of a first event and counting occurrences of a second event; and said performance monitoring interrupt signal is generated if, when a counted number of first events reaches a first event threshold value, a counted number of second events satisfies an interrupt triggering condition.

The above, and other objects, features and advantages of this invention will be apparent from the following detailed description of illustrative embodiments which is to be read in connection with the accompanying drawings.

BRIEF DESCRIPTION OF THE DRAWINGS

FIG. 3 illustrates an example of triggering a performance monitoring interrupt signal in response to the number of events counted by the first event counter and the second event counter;

FIG. 4 shows a table indicating different types of events which may be counted by the performance monitoring circuitry;

DESCRIPTION OF EMBODIMENTS

Figure 1:
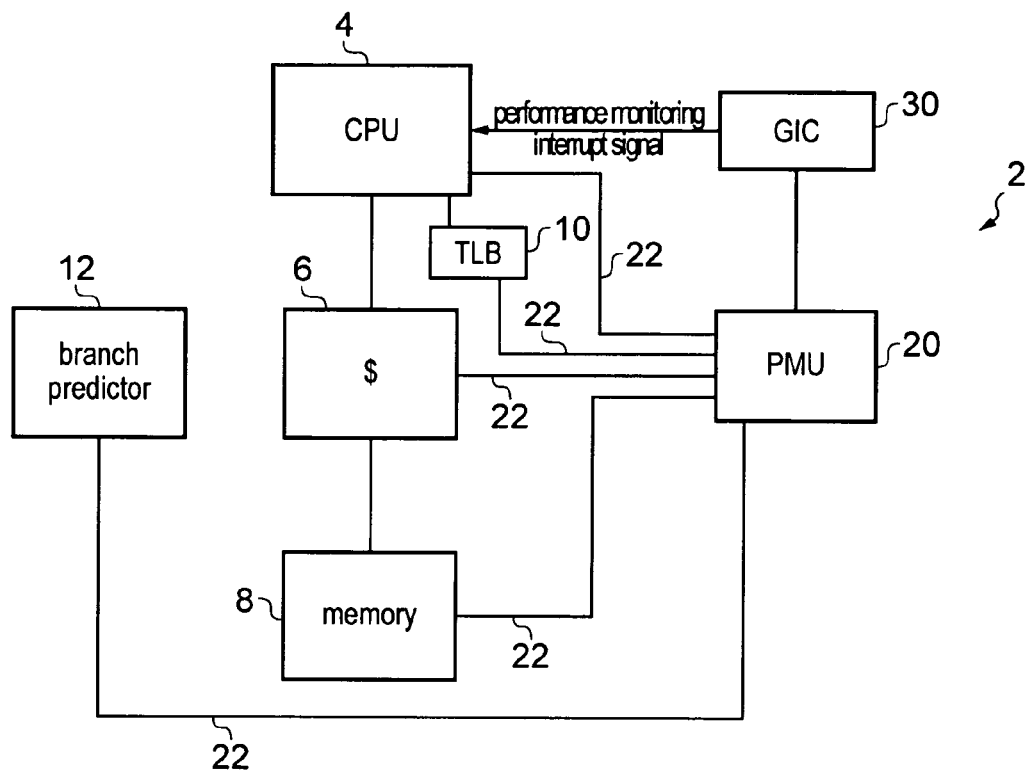
FIG. 1 schematically illustrates a data processing apparatus having performance monitoring circuitry.

FIG. 1 shows a data processing apparatus 2 having a processor 4 for performing data processing, a cache 6 for storing data for processing by the processor 4, and a memory 8. The apparatus 2 also has a translation lookaside buffer (TLB) 10 for storing virtual-to-physical address translation data for mapping virtual addresses used by the processor 4 to physical addresses used by the memory 8, and a branch predictor 12 for predicting whether branch instructions are taken or not taken. The arrangement shown in FIG. 1 is an example and it will be appreciated that the apparatus 2 may also comprise other elements not shown in FIG. 1.

The apparatus 2 comprises a performance monitoring unit 20 for generating performance monitoring data indicative of processing performance of the data processing apparatus 2. The performance monitoring unit 20 receives event signals 22 from the other elements 4, 6, 8, 10, 12 of the data processing apparatus 2, with each signal 22 indicating the occurrence of a corresponding event. For example, an event signal 22 may be received from the processor 4 indicating the elapse of a processing cycle or the execution of an instruction, or an event signal may be received from the cache 6 or TLB 10 indicating a cache or TLB access or miss. Event signals 22 may also be received from memory 8 indicating a memory access, or from branch predictor 12 indicating a branch prediction or a branch misprediction. It will be appreciated that these examples are not exhaustive and the performance monitoring unit 20 may also receive signals indicating many other kinds of event. In response to the signals 22, the performance monitoring unit 20 generates performance monitoring data. The performance monitoring data may be captured and analysed later to determine the performance of the apparatus 2.

The apparatus 2 also includes an interrupt controller 30 for generating interrupt signals. In response to an interrupt signal, the processor 4 interrupts its current processing and executes an interrupt handling routine corresponding to the interrupt signal. Many different interrupt signals may be generated for different purposes, for example to trigger the processor to execute a particular task or to signal an error. One type of interrupt signal is a performance monitoring interrupt signal which is generated by the interrupt controller 30 in response to the performance monitoring data generated by the performance monitoring unit 20. Hence, if the performance monitoring data indicates a particular performance condition, then the interrupt controller 30 may interrupt the processing of the processor 4 and trigger the processor 4 to perform a predetermined operation associated with the detected performance condition.

Figure 2:
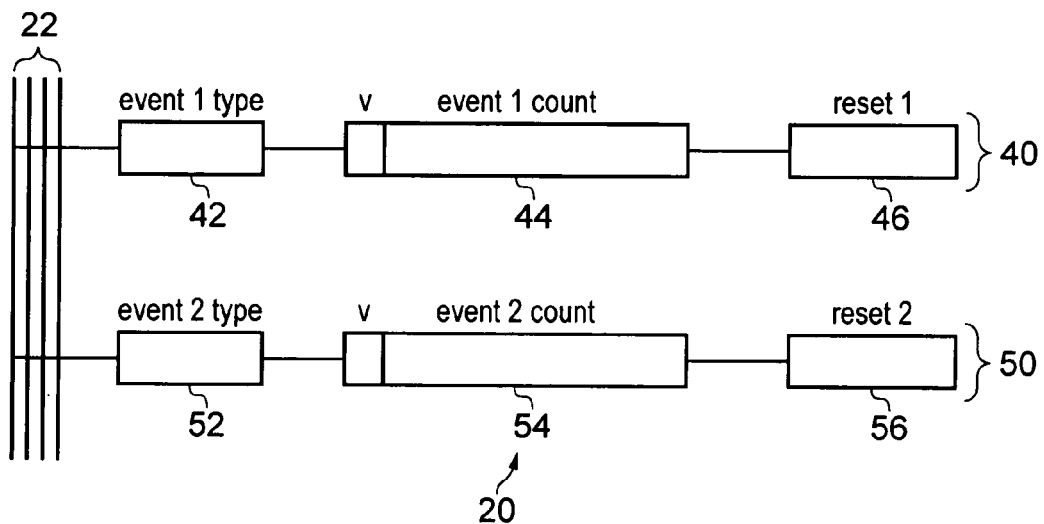
FIG. 2 shows examples of a first event counter and a second event counter.

FIG. 2 shows a portion of the performance monitoring unit 20 for monitoring a performance metric corresponding to the number of events of a second type that occur per occurrence of an event of a first type. The performance monitoring unit 20 includes a first performance counter 40 for counting occurrences of the first event and a second event counter 50 for counting occurrences of the second event. Each event counter 40, 50 includes an event type register 42, 52, an event count register 44, 54 and a reset register 46, 56. The event type registers 42, 52 define which type of event is counted as the first event or the second event by the two event counters 40, 50. Each event counter 40, 50 receives the event signals 22 indicating various events occurring within the processing apparatus 2, and the event type register 42, 52 contains an event type value indicating which of the event signals 22 the event counter is responsive to. When the event signal 22 corresponding to the event type identified in the event type register 42, 52 is asserted to indicate an occurrence of that event, then the event count stored in the event count register 44, 54 is incremented. The incrementing may be performed either by adding 1 to the previous count value, or by subtracting 1 from the previous value.

The event count registers 44, 54 have an overflow bit V which indicates whether an overflow has occurred. For example, if the event count value is being incremented by adding 1 in response to each occurrence of the event, then after a given number of events the event count value will be saturated with bit values of '1', and a further occurrence of the event will cause the event count value to overflow. Similarly, if subtracting 1 from the event count value in response to each occurrence of the event, then eventually the event count value will be saturated with bit values of '0' and a further occurrence of the event will then cause the event count value to overflow to a value of '1' bit values. When an overflow occurs, then the overflow bit V will change from a value of '0' to a value of '1'.

The interrupt controller 30 monitors the overflow bit V of the two event count registers 44, 54 to determine whether the count value has overflowed. When the first event count register 44 overflows, then the interrupt controller 30 detects whether the second event count register 54 has overflowed. Depending on whether the second event count register has overflowed, the interrupt controller 30 determines whether to generate a performance monitoring interrupt signal. In some cases, the interrupt signal is generated when, at the time that the first event count value has overflowed, the second event count value has also overflowed. In this case, the triggering of the interrupt indicates that the number of second events per first event is greater than, or equal to, a particular rate. In other cases, the interrupt is generated when, at the time that the first event count value has overflowed, the second event count value has not overflowed. In this case, the generation of the interrupt indicates that the number of second events per first event is less than a particular rate. Whichever condition is used to trigger the interrupt, no interrupt is generated when the interrupt triggering condition is not satisfied. Hence, the processor 4 is only interrupted if the performance metric (number of second events per first event) meets the required condition. There is no need to interrupt the processing of the processor 4 unnecessarily if the second event count register has not met the required condition when the first event count register has overflowed.

The reset register 46, 56 of each event counter 40, 50 stores an initial value which is written to the first event count register 44 or second event count register 54 at startup and each time the first event count register has overflowed. The values stored in the reset registers 46, 56 determine the threshold at which the interrupt is generated. The user can program the reset registers 46, 56 with values for setting desired thresholds for the two performance counters 40, 50. For example, consider a case where the user wishes to monitor whether the number of second events per first event is greater than or equal to Y/X. Assuming that both event count registers 44, 54 add 1 to the event count value at each occurrence of the event, then the second initial value in the second reset register 56 is set to the 2's complement of Y, and the first initial value in the first reset register 46 is set to the 2's complement of X. The first and second event count registers 44, 54 are initialised to the first and second initial values respectively. After X occurrences of the first event, the first event count register 44 will overflow, and at this point the interrupt controller 30 checks whether the second event count register 46 has overflowed. If the second event count register 46 has overflowed (i.e. there have been at least Y second events), then an interrupt is generated indicating that the number of second events per first event is greater than, or equal to, Y/X. If there has been no overflow, then no interrupt is generated (since the performance metric has not met the required condition). The event count registers 44, 54 are then reset to the values stored in the reset registers 46, 56, and begin counting first and second events for another period of X first events.

Similarly, if counting events by subtracting one from the current event count value in response to each occurrence of the event, then the first and second initial values would be set to X−1 and Y−1 respectively, so that after being reset to the initial values, the first and second event counters will overflow after a further X and Y counts respectively.

FIG. 3 shows an example in which the performance metric being monitored is the number of instructions per cycle. Therefore, the first event is the elapse of a processing cycle and the second event is the execution of an instruction. In this case, it is desired to check whether, over a period of 1000 processing cycles, the number of instructions per cycle is greater than or equal to a half. If the number of instructions per cycle is less than a half then no interrupt is to be generated, while if the number of instructions per cycle is greater than or equal to a half then an interrupt is to be generated. Therefore, the first reset value in the first reset register 46 is equal to the 2's compliment of 1000, so that after being initialised the first event count register 44 will overflow after 1000 cycles. The second reset value in the second reset register 56 is equal to the 2's complement of 500, so that after being initialised the second event count register 54 will overflow after the execution of 500 instructions. Part a of FIG. 3 shows the initial status of the registers 44, 54, 46, 56. Part b of FIG. 3 shows the state of the registers after 1000 cycles have elapsed. The elapse of the 1000$^{th}$ cycle causes the first event count register 44 to overflow so that the overflow bit V switches from zero to one. At this point, the interrupt controller 30 checks the overflow bit V of the second event count register 54. In this example, at the time when the first event count register 44 overflows, only 448 instructions have been executed, and so the second event count register 54 has not yet overflowed. Therefore, the interrupt controller 30 does not generate an interrupt (the fact that the second event count register 54 has not overflowed indicates that the number of instructions per cycle is less than half during the 1000 cycles).

Next, as shown in part c of FIG. 3, both event count registers 44, 54 are reset to the value stored in the reset register 46, 56. After another 1000 cycles, the first event count register 44 again overflows as shown in part D. On detecting the overflow, the interrupt controller 30 checks whether the second event count register 54 has also overflowed. In this case, 502 instructions were executed in the 1000 cycles, and so the second event count register 54 has already overflowed. Therefore, the interrupt controller 30 generates an interrupt signal in this situation to indicate that the number of instructions per cycle is greater than a half. The interrupt signal is sent to the processor 4 which performs a predetermined operation based on the interrupt. As will be explained below, the predetermined operation may be any operation which uses the performance monitoring data of the performance monitoring unit 20 in some way.

Hence, as shown in FIG. 3, the interrupt is only generated when the desired performance metric (instructions per cycle) has exceeded the threshold identified by the initial values in the reset registers 46, 56. While FIG. 3 shows an example in which the interrupt is generated when the second event register 54 has already overflowed by the time the first event count register 44 overflows, it is also possible to trigger the interrupt when the second event count register 54 has not overflowed at the time when the first event count register 44 overflows. The event counters 40, 50 may be provided with a trigger condition register (not illustrated in FIG. 2) which defines whether or not the interrupt should be triggered when the second event count register 54 overflows or when the second event count register 54 does not overflow.

The types of events which may be counted by the event counters 40, 50 may vary considerably. FIG. 4 shows a table listing many examples of events which can be counted. The event number represents the value which can be stored in the event type register 42, 52 to identify the corresponding type of event to be counted. The event number identifies which of the event signals 22 the event counter 40, 50 is 'listening to' when detecting occurrences of the corresponding event. It will be appreciated that the mapping between event numbers and event types in FIG. 4 is merely an example and that many other different kinds of events may also be counted.

Hence, many difference kinds of performance metrics may be monitored by selecting appropriate first and second events. As mentioned above, to detect the instructions executed per cycle, the first event is the elapse of a processing cycle and the second event is the execution of an instruction. Also, to detect a cache miss rate the first event may be a cache access while the second event may be a cache miss. To detect the number of cache misses per TLB miss, the first event may be a TLB miss and the second event may be a cache miss. To detect the number of cache misses per thousand instructions, the first event may be the execution of an instruction and the second event may be a cache miss. In general, to detect any performance metric A/B (where A is a numerator event and B is a denominator event), the first event counter 40 is set to count occurrences of the denominator event B and the second event counter 50 is set to count occurrences of the numerator event A.

Figure 5:
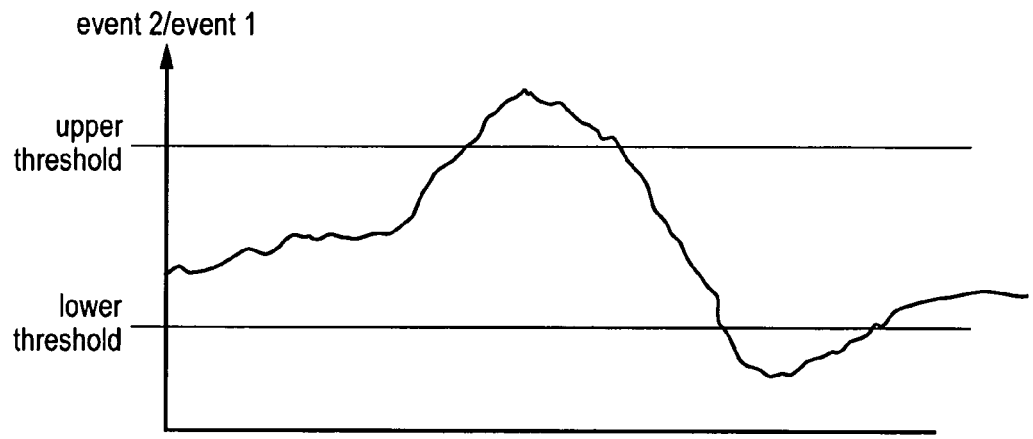
FIG. 5 shows an example in which the performance monitoring circuitry may detect whether the number of events of a second type per event of a first type has risen above an upper threshold or fallen below a lower threshold.

The example shown in FIGS. 2 and 3 compares the performance metric (second events per first event) with a given threshold. However, sometimes one may wish to set multiple thresholds for the performance metric. FIG. 5 shows an example in which the number of second events per first event is compared with both an upper threshold and a lower threshold. For example, if the performance metric becomes higher than the upper threshold or lower than the lower threshold, then this indicates an abnormal situation in which an interrupt should be generated, while for values between the upper threshold and lower threshold the conditions may be considered to be normal and so no interrupt would be required.

Figure 6:
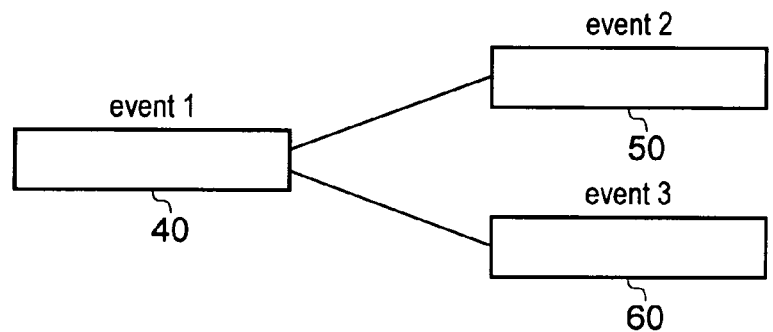
FIG. 6 shows an example of pairing two different event counters with the same first event counter.

FIG. 6 shows an example arrangement of performance counters which can be used to implement the comparison of FIG. 5. A third event counter 60 is provided in addition to the first and second event counters 40, 50. Each event counter would comprise an event type register, event count register and reset register as shown in FIG. 2. In this case, the first event counter 40 counts a first event as before. The second and third event counters 50, 60 both count the same second event. However, the second and third event counters 50, 60 are provided with different initial values in the corresponding reset registers, corresponding to the different upper and lower thresholds shown in FIG. 5. For example, the second event counter 50 may correspond to the upper threshold and the third event counter 60 may correspond to the lower threshold. When the first event counter 40 overflows, indicating that a given number of first events have occurred, then the interrupt 30 may check whether the second and third event counters 50, 60 have overflowed. An interrupt signal may be generated if the second event counter 50 has overflowed or if the third event counter 60 has not overflowed, indicating that either the upper threshold has been exceeded or the lower threshold has not been exceeded.

Alternatively, the second and third event counters 50, 60 of FIG. 6 may be configured to count different numerator events. For example, different performance metrics may have the same denominator event, such as instructions per cycle and branch mispredictions per cycle. In this case, the second and third event counters 50, 60 may count executed instructions and branch mispredictions respectively, and the first event counter 40 may count processing cycles. Different threshold conditions can be set in the second and third event counters 50, 60. In this case, when the first counter 40 overflows indicating the elapse of a given number of processing cycles, then the interrupt controller 30 may check whether either of the second and third registers 50, 60 has overflowed and generate an interrupt if the corresponding interrupt triggering condition has been satisfied. As shown in examples a) and b) of FIG. 6, the performance metrics corresponding to the number of second events per first event and the number of third events per first event may be monitored individually or in combination. In example a) the interrupt is generated if either of the second and third event counters 50, 60 have met their interrupt triggering condition. Alternatively, in example b) both second and third event counters 50, 60 must meet their interrupt triggering condition before an interrupt is triggered.

While FIG. 6 shows an example with two counters 50, 60 linked to the same first event counter 40, it will be appreciated that in other examples there could be two or more further event counters 60 in addition to the second event counter 50.

In response to the performance monitoring interrupt signal generated by the interrupt controller 30, the data processing apparatus 2 may perform many different kinds of operation. For example, the interrupt controller 30 may generate several different kinds of performance monitoring interrupt signal in response to different performance conditions detected by the performance monitoring unit 20, with each different performance monitoring interrupt signal triggering a different predetermined operation to be performed by the processor 4 or by another element of the data processing apparatus 2.

In one example, the processor 4 may have an operating system which schedules tasks for execution on the processor 4. The performance metric monitored by the performance monitoring unit 20 may be useful for influencing tasks scheduling, and so the performance monitoring interrupt signal may be used to provide feedback to the operating system scheduler when a performance metric exceeds, or does not exceed, a given threshold.

Figure 7:
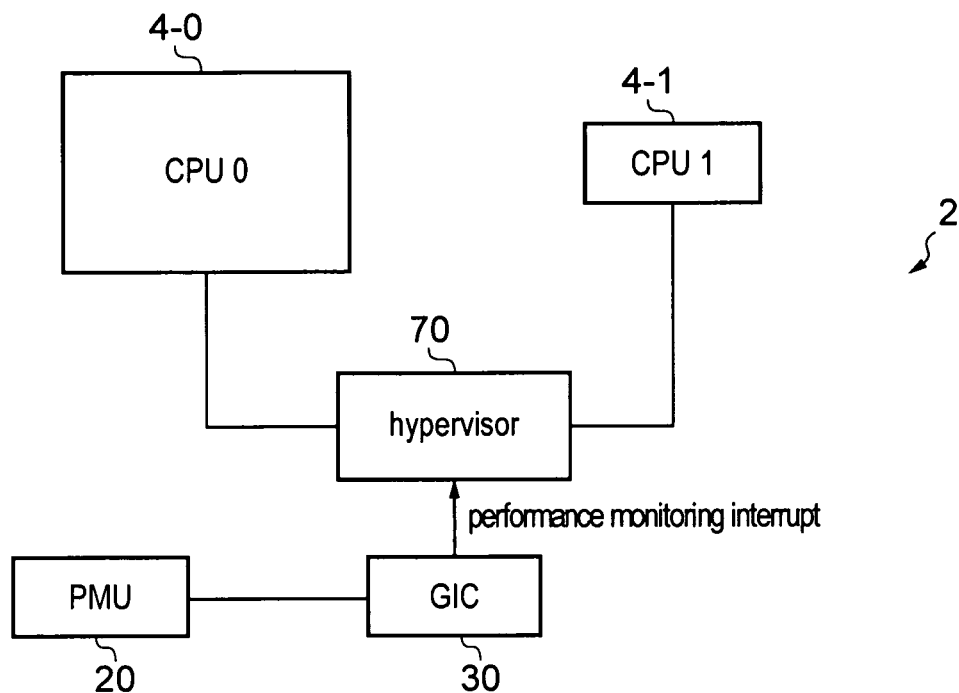
FIG. 7 shows an example of a heterogeneous processing system.

In the example of FIG. 7, the processing apparatus 2 may comprise several heterogeneous processors 4-0, 4-1. The processors 4-0, 4-1 are of different configurations, for example with one processor 4-0 being more powerful but less energy efficient than the other processor 4-1. A hypervisor 70 may control whether tasks are executed on 'big processor' 4-0 or 'little processor' 4-1. For example, if highly intensive processing is performed for which high performance is required, then the more powerful processor 4-0 may be used, while if less processor-intensive processing is being performed, then the more energy-efficient processor 4-1 may be used. This enables an improved balance between processing performance and energy-efficiency to be achieved. The performance monitoring data monitored by the performance monitoring unit 20 can useful for indicating whether processing can be performed more efficiently using processor 4-0 or processor 4-1, and so the performance monitoring interrupt signal 30 may influence task allocation by the hypervisor 70. For example, the performance monitoring interrupt signal may indicate that a thread or task has inappropriately been scheduled on the big processor 4-0 or little processor 4-1, or may provide feedback when a given performance metric has, or has not, exceeded a threshold.

Figure 8:
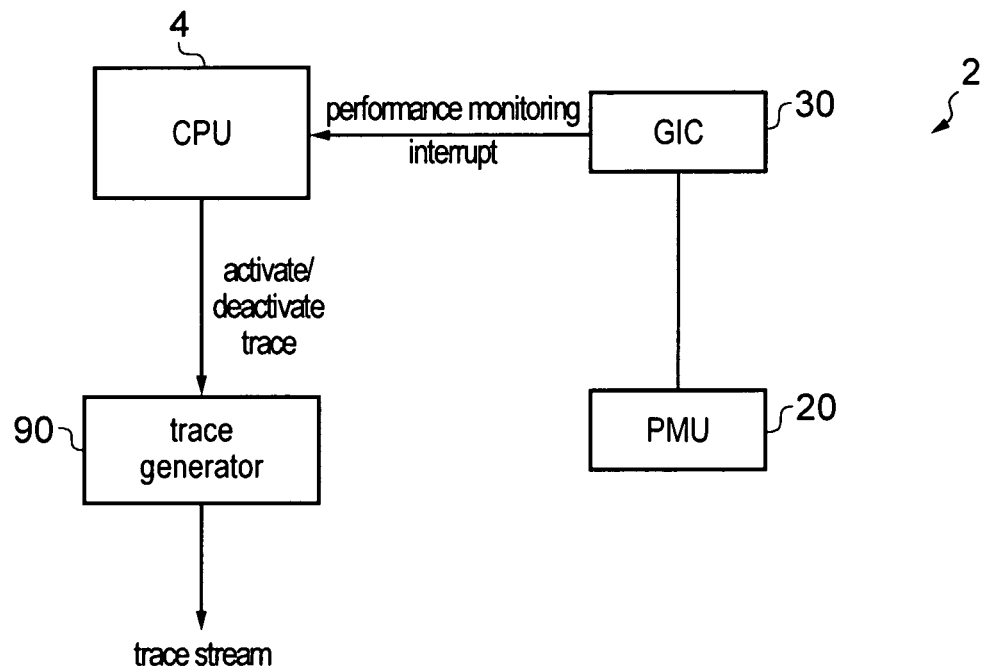
FIG. 8 shows an example of activating or deactivating trace data generation based on the performance monitoring interrupt.

Also, as shown in FIG. 8 the apparatus 2 may comprise a trace generating unit 90 which generates a trace stream indicating operations being performed by the processor 4. For example, the trace stream may include information identifying the instructions executed by the processor 4 and the data accessed by the processor 4. During normal processing conditions, the trace stream may not be of interest. However, if the performance monitoring data generated by performance monitoring unit 20 indicates a more unusual performance situation, then the trace data may be more interesting as analysis of the trace data may enable the cause of the performance issue to be determined. To save trace bandwidth, then the performance monitoring interrupt generated by interrupt controller 30 may be used by the processor 4 to activate trace generation by the trace generator 90 when performance issues of interest have been detected and to deactivate the trace generation when the performance issues of interest no longer occur.

Similarly, performance profiling may be activated or deactivated based on the performance monitoring interrupt. For example, capture of the performance monitoring data from the performance monitoring unit 20 may be restricted to periods when a given performance condition has been detected, to avoid storing large amounts of performance data when no performance condition of interest has been detected.

It will be appreciated that many other operations could be performed in response to the performance monitoring interrupt signal.

Figure 9:
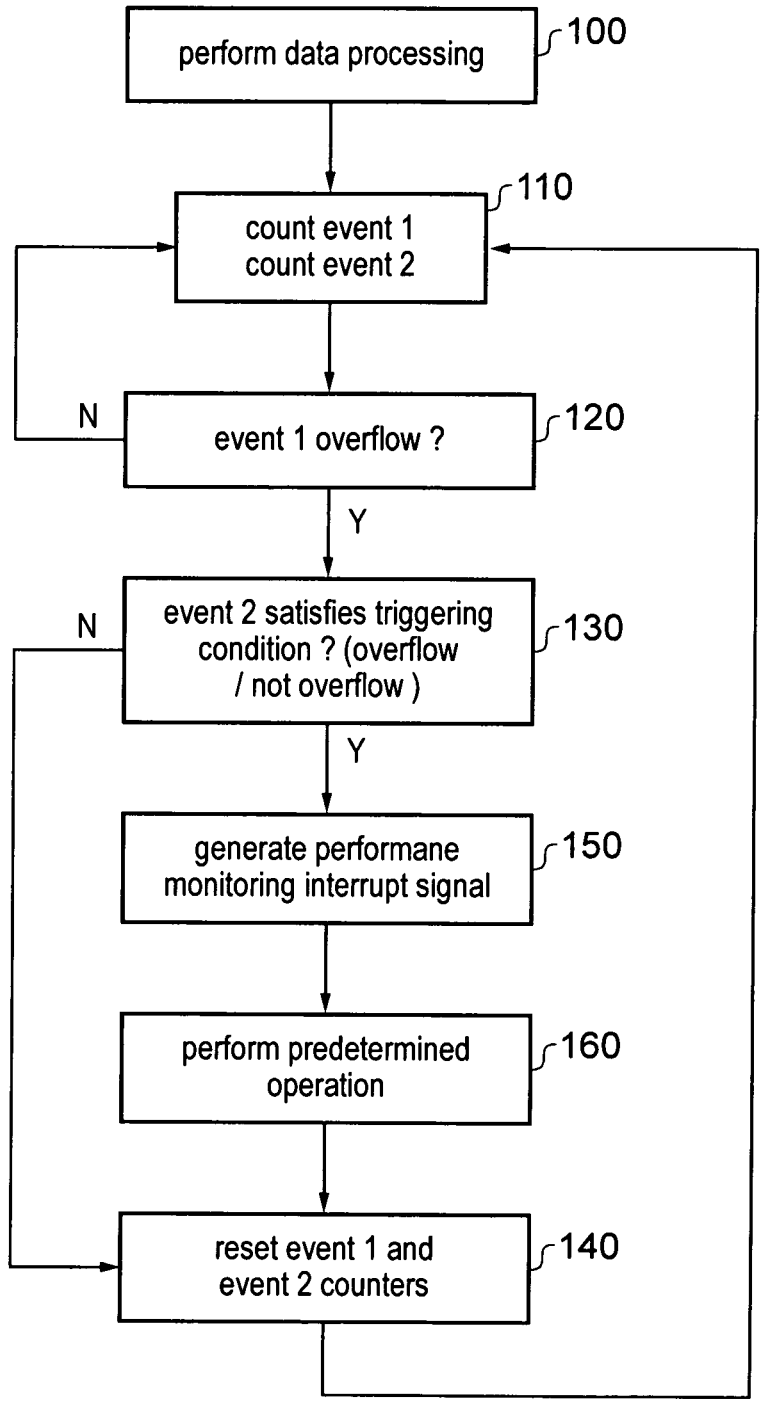
FIG. 9 illustrates a method of performance monitoring.

FIG. 9 shows a method of performance monitoring. At step 100, data processing is performed. The data processing continues during the rest of the method. At step 110, the first event counter 40 counts occurrences of a first event and the second event counter 50 counts occurrences of a second event. The type of event counted by each counter 40, 50 is determined by the corresponding event type register 42, 52. At step 120, the interrupt controller 30 determines whether or not the first event count register 44 has overflowed. If no overflow has occurred, then processing continues and the first events and second events continue to be counted at step 110.

When an overflow of the first event count register 44 is detected, then at step 130 the interrupt controller determines whether or not the second event count register 54 satisfies the triggering condition. The interrupt triggering condition may be either that the second event count register 54 has overflowed or that the second event count register 54 has not overflowed. If the interrupt triggering condition has not occurred, then the method proceeds to step 140 where both event count registers 44, 54 are reset to the initial values stored in the corresponding reset registers 46, 56. The resetting of the event count registers 44, 54 may be performed in hardware by the performance monitoring unit 20 or the interrupt controller 30 without input from the processor 4. The method then returns to step 110 where counting of the events continues.

On the other hand, if on occurrence of the first event overflow at step 120, it was found at step 130 that the second event count register 54 did satisfy the triggering condition, then at step 150 the interrupt controller 30 generates the performance monitoring interrupt signal. The interrupt signal is passed to the processor 4 which at step 160 performs the predetermined operation associated with that interrupt signal (or triggers another element of the processing apparatus 2 to perform the predetermined operation). The predetermined operation to be performed may be defined in an interrupt handling routine associated with the performance monitoring interrupt signal. At step 140, the event count registers are once more reset to the initial values from the reset registers. In the case where an interrupt has been generated, the resetting of the event count registers may be controlled either by the performance monitoring unit and interrupt controller 20, 30 in hardware or by the processor 4 under control of the interrupt handling routine. The method then returns to step 110 where counting of the events continues once more. The method of FIG. 9 continues iteratively until either data processing is halted or performance monitoring is deactivated.

Although illustrative embodiments of the invention have been described in detail herein, with reference to the accompanying drawings, it is to be understood that the invention is not limited to those precise embodiments, and that various changes and modifications can be made by one skilled in the art without departing from the scope of the invention that is defined by the appended claims.

We claim:

1. A data processing apparatus for performing data processing, comprising:
   performance monitoring circuitry configured to generate performance monitoring data indicative of processing performance of said data processing apparatus; and
   an interrupt controller configured to generate, in response to said performance monitoring data, a performance monitoring interrupt signal for triggering said data processing apparatus to perform a predetermined operation;
   wherein said performance monitoring circuitry comprises a first event counter configured to count occurrences of a first event and a second event counter configured to count occurrences of a second event; and
   said interrupt controller is configured to generate said performance monitoring interrupt signal, when the number of first events counted by said first event counter reaches a first event threshold value and the number of second events counted by said second event counter satisfies an interrupt triggering condition, said interrupt controller is configured to not generate said performance monitoring interrupt signal when the number of first events counted by said first event counter reaches said first event threshold value and the number of second events counted by said second event counter does not satisfy said interrupt triggering condition.

2. The data processing apparatus according to claim 1, wherein said interrupt triggering condition is satisfied if said number of second events counted by said second event counter has reached a second event threshold value.

3. The data processing apparatus according to claim 1, wherein said interrupt triggering condition is satisfied if said number of second events counted by said second event counter has not reached a second event threshold value.

4. The data processing apparatus according to claim 1, wherein said first event counter comprises a first event count register incremented in response to each occurrence of said first event and said second event counter comprises a second event count register incremented in response to each occurrence of said second event.

5. The data processing apparatus according to claim 1, wherein said performance monitoring circuitry is configured to reset said first event counter to a first initial value and to reset said second event counter to a second initial value if said number of second events does not satisfy said interrupt triggering condition when said number of first events counted by said first event counter reaches said first event threshold value.

6. The data processing apparatus according to claim 1, comprising at least one further event counter configured to count occurrences of at least one further event;
   wherein said interrupt controller is configured to generate said performance monitoring interrupt signal if, when said number of first events reaches said first event threshold value, at least one of the number of second events counted by said second event counter and the number of further events counted by said at least one further event counter satisfies a corresponding interrupt triggering condition.

7. The data processing apparatus according to claim 1, wherein said first event and said second event comprise any two of the following events:
   a processing cycle elapsing;
   an instruction being executed;
   an instruction being executed speculatively;
   an instruction of a predetermined type being executed;
   a cache access;
   a cache miss;
   a translation lookaside buffer access;
   a translation lookaside buffer miss;
   a memory access;
   a bus access;
   a branch prediction; and
   a branch misprediction.

8. The data processing apparatus according to claim 1, wherein said predetermined operation comprises an operating system controlling task scheduling in dependence on said performance monitoring interrupt signal.

9. The data processing apparatus according to claim 1, comprising a plurality of processors configured to perform data processing;
   wherein said predetermined operation comprises controlling switching of processing between said plurality of processors in dependence on said performance monitoring interrupt signal.

10. The data processing apparatus according to claim 1, comprising trace generating circuitry configured to generate trace data indicative of operations performed by said data processing apparatus;
    wherein said predetermined operation comprises activating or deactivating said trace generating circuitry in response to said performance monitoring interrupt signal.

11. The data processing apparatus according to claim 4, wherein said interrupt controller is configured to detect whether said first event count register has overflowed, and if said first event count register has overflowed, to determine whether to generate said performance monitoring interrupt signal in dependence on whether said second event count register has overflowed.

12. The data processing apparatus according to claim 5, wherein said first event counter comprises a first reset register for storing said first initial value and said second event counter comprises a second reset register for storing said second initial value.

13. The data processing apparatus according to claim 6, wherein said interrupt controller is configured to generate said performance monitoring interrupt signal if, when said number of first events reaches said first event threshold value, said number of second events counted by said second event counter and said number of further events counted by said at least one further event counter all satisfy said corresponding interrupt triggering condition.

14. The data processing apparatus according to claim 9, wherein said plurality of processors are heterogeneous processors.

15. The data processing apparatus for performing data processing, comprising:
performance monitoring circuitry configured to generate performance monitoring data indicative of processing performance of said data processing apparatus; and
an interrupt controller configured to generate, in response to said performance monitoring data, a performance monitoring interrupt signal for triggering said data processing apparatus to perform a predetermined operation;
wherein said performance monitoring circuitry comprises a first event counter configured to count occurrences of a first event and a second event counter configured to count occurrences of a second event; and
said interrupt controller is configured to generate said performance monitoring interrupt signal if, when the number of first events counted by said first event counter reaches a first event threshold value, the number of second events counted by said second event counter satisfies an interrupt triggering condition, wherein said first event counter comprises a first event type register configured to store a first event type value defining what type of event is counted as said first event by said first event counter; and
said second event counter comprises a second event type register configured to store a second event type value defining what type of event is counted as said second event by said second event counter.

16. The data processing apparatus for performing data processing, comprising:
performance monitoring circuitry configured to generate performance monitoring data indicative of processing performance of said data processing apparatus; and
an interrupt controller configured to generate, in response to said performance monitoring data, a performance monitoring interrupt signal for triggering said data processing apparatus to perform a predetermined operation;
wherein said performance monitoring circuitry comprises a first event counter configured to count occurrences of a first event and a second event counter configured to count occurrences of a second event; and
said interrupt controller is configured to generate said performance monitoring interrupt signal if, when the number of first events counted by said first event counter reaches a first event threshold value, the number of second events counted by said second event counter satisfies an interrupt triggering condition, wherein said predetermined operation comprises starting or stopping capturing of said performance monitoring data in response to said performance monitoring interrupt signal.

17. A data processing method comprising steps of:
performing data processing using a data processing apparatus;
generating performance monitoring data indicative of processing performance of said data processing; and
generating, in response to said performance monitoring data, a performance monitoring interrupt signal for triggering said data processing apparatus to perform a predetermined operation;
wherein said step of generating performance monitoring data includes counting occurrences of a first event and counting occurrences of a second event; and
said performance monitoring interrupt signal is generated when a counted number of first events reaches a first event threshold value and a counted number of second events satisfies an interrupt triggering condition, and said performance monitoring interrupt signal is not generated when the counted number of first events reaches said first event threshold value and the number of second events counted by said event counter does not satisfy said interrupt triggering condition.

* * * * *